US007035495B2

(12) United States Patent
Takahashi et al.

(10) Patent No.: US 7,035,495 B2
(45) Date of Patent: Apr. 25, 2006

(54) CHROMATIC DISPERSION DEVICE

(75) Inventors: Hidenori Takahashi, Kamifukukoka (JP); Ryo Inohara, Kamifukuoka (JP); Kosuke Nishimura, Kamifukuoka (JP); Masashi Usami, Kamifukuoka (JP)

(73) Assignee: KDDI Corporation, Tokyo (JP)

( * ) Notice: Subject to any disclaimer, the term of this patent is extended or adjusted under 35 U.S.C. 154(b) by 35 days.

(21) Appl. No.: 10/964,954

(22) Filed: Oct. 13, 2004

(65) Prior Publication Data

US 2005/0117842 A1 Jun. 2, 2005

(30) Foreign Application Priority Data

Oct. 20, 2003 (JP) ............................ 2003-358767

(51) Int. Cl.
*G02B 6/26* (2006.01)

(52) U.S. Cl. ........................... 385/15; 385/27; 385/39; 385/50

(58) Field of Classification Search ................. 385/15, 385/27, 29, 50
See application file for complete search history.

(56) References Cited

U.S. PATENT DOCUMENTS

2003/0194166 A1* 10/2003 Madsen ....................... 385/11
2003/0235367 A1* 12/2003 Yamazaki .................... 385/39
2004/0023396 A1* 2/2004 Boyd et al. ................. 435/872
2005/0013537 A1* 1/2005 Yamazaki .................... 385/27

OTHER PUBLICATIONS

Jablonski, et al., "Adjustable dispersion-slope compensator using entirely thin-film coupled-cavity allpass filters in a multi-reflection parallel configuration," Optical Fiber Communication Conference, Anaheim, CA., 2001, TuS3-1-3.

Moss, et al., "Multichannel tunable dispersion compensation using all-pass multicavity etalons," OFC 2002, Tuesday Afternoon, Anaheim, CA., 2002, TuT2 5:00 pm, pp. 132-133.

Madsen, et al., "Compact Integrated Tunable Chromatic Dispersion Compensator with a 4000 ps/nm Tuning Range," Optical Fiber Communication Conference, Anaheim, CA., 2001, PD9-1-3.

Takahashi, et al., "Analysis of tunable dispersion compensator dynamics using ring resonator with symmetric Mach-Zehnder Interferometer," The Institute of Electronics, Information and Communication Engineers pp. 17-22 and English Translation pp. 1-11.

* cited by examiner

*Primary Examiner*—John D. Lee
*Assistant Examiner*—Rhonda S. Peace
(74) *Attorney, Agent, or Firm*—Christie, Parker & Hale, LLP

(57) ABSTRACT

A chromatic dispersion device according to the invention comprises an input/output waveguide, a plurality of first ring waveguides and a second ring waveguide. The plurality of first ring waveguides optically couple with the input/output waveguide through directional coupling and are disposed along an optical axis direction of the input/output waveguide, each ring waveguide having a predetermined FSR (free spectral range) and group delay characteristics with a peak value of the same polarity. The second ring waveguide optically couples with the input/output waveguide through directional coupling, the second ring waveguide having the predetermined FSR and group delay characteristics with a peak value of a polarity different from those of the first ring waveguides.

12 Claims, 10 Drawing Sheets

10
14
14a
14b
14c
16
16a
16b
16c
18
18a
18b
18c
20
20a
20b
20c
22
22a
22b
22c
22d
Loss
12
12a
12b
Input
Output

CHROMATIC DISPERSION DEVICE

CROSS REFERENCE TO RELATED APPLICATIONS

This application claims priority to Japanese Patent Application No. 2003-358767, filed Oct. 20, 2003, the entire contents of which are incorporated herein by reference.

FIELD OF THE INVENTION

This invention relates to a chromatic dispersion device having a different chromatic dispersion value according to a wavelength.

BACKGROUND OF THE INVENTION

There are two types of chromatic dispersion devices in which a chromatic dispersion value varies almost linearly according to a wavelength; one is an all-pass resonator Fabry-Perot etalon (FPE) type (see, M. Jablonski, et al., "Adjustable dispersion-slope compensator using entirely thin-film coupled-cavity all pass filters in a multi-reflection parallel configuration," Optical Fiber Communication Conference, Anaheim, Calif., 2001, TuS3; and D. J. Moss, et al., "Multichannel Tunable Dispersion Compensation Using All-Pass Multicavity Etalons," Optical Fiber Communication Conference, Anaheim, Calif., 2002, TuT2), and the other type is ring resonator type (see C. K. Madsen, et al., "Compact Integrated Tunable Chromatic Dispersion Compensator with a 4000 ps/nm Tuning Range," Optical Fiber Communication Conference, Anaheim, Calif., 2001, PD9). Both types of the chromatic dispersion devices can compensate chromatic dispersion of a plurality of wavelengths in a lump and suitable for wavelength division multiplexing (WDM) transmission. A ring resonator type chromatic dispersion device, in particular, has a wide variable range of ±1000 ps/nm or more.

FIG. 9 shows a schematic diagram of a conventional ring resonator type chromatic dispersion device. In FIG. 9, a chromatic dispersion device 110 comprises a linear input/output waveguide 112 and a plurality of ring waveguides 114, 116, 118, and 120 disposed along an optical axis of the input/output waveguide 112 and directionally coupled with the waveguide 112. Free spectral ranges (FSR) of the ring waveguides 114 to 120 are set equally.

A part of light entered the input/output waveguide 112 couples with the waveguide 114 at the optically coupled part with the ring waveguide 114. The light coupled with the ring waveguide 114 makes one circuit of the ring waveguide 114 and couples with the input/output waveguide 112 again. A similar operation is also carried out in the other ring waveguides 116, 118, and 120. Input/output characteristics of the chromatic dispersion device 110 are obtained by multiplying input/output characteristics of the respective ring waveguides 114 to 120. By adjusting coupling factor between each of the ring waveguides 114 to 120 and the waveguide 112, group delay characteristics of the respective ring waveguides 114 to 120 can be controlled.

FIG. 10 shows group delay characteristics 124 to 130 of the ring waveguides 114 to 120 respectively and total group delay characteristics 132. In FIG. 10, the horizontal axis expresses relative angular frequency $(\Omega-\Omega_0)$/FSR, and the vertical axis expresses relative group delay $\tau(\Omega)/T$. The symbol $\Omega$ denotes angular frequency of a light input to the optical waveguide 112, $\Omega_0$ denotes a standard angular frequency, T denotes a standard delay time (second), and $\tau(\Omega)$ denotes group delay time of the chromatic dispersion device 110. As shown in FIG. 10, the group delay time $\tau(\Omega)$ of the chromatic dispersion device 110 ranges from $-\pi/2$ to a value slightly lower than $\pi$ and varies almost linearly relative to the angular frequency Co. This range becomes a band usable for chromatic dispersion compensation, namely passband 134. The range removed the passband 134 from the FSR indicates an unusable band 136.

In a conventional ring resonator type chromatic dispersion device, a group delay of each ring waveguide indicates a symmetrical resonant peak shape and each peak has the same sign (the positive sign in FIG. 10). As a result, the composite characteristics inevitably go off the straight line at the bottom part and therefore the unusable band 136 is appeared as shown in FIG. 10.

SUMMARY OF THE INVENTION

A chromatic dispersion device according to one embodiment of the invention comprises an input/output waveguide, a plurality of first ring waveguides optically coupled with the input/output waveguide in directional coupling and disposed along an optical axis of the input/output waveguide, each first ring waveguide having a predetermined FSR and group delay characteristics with a peak value of the same polarity, and a second ring waveguide optically coupled with the input/output waveguide in directional coupling, the second ring waveguide having the predetermined FSR and group delay characteristics with a peak value of a polarity different from those of the first ring waveguides.

Since the second ring waveguide has the group delay characteristics having a peak value of a polarity opposite to those of the group delay characteristics of the first ring waveguides, it is possible to extend the group delay characteristics formed by the first ring waveguide using the second ring waveguide. With this configuration, the usable band can be extended.

Preferably, each of the first and second ring waveguides is optically coupled at two optically coupled parts forming a Mach-Zehnder interferometer in the input/output waveguide. With this configuration, the control and change of the group delay characteristics of each ring waveguide becomes easy.

Preferably, the first ring waveguide comprises a phase shifter on one of two arms of the Mach-Zehnder interferometer, the one arm located on the first ring waveguide. By adjusting a phase shifting amount of the phase shifter, the group delay characteristics of the first ring waveguide can be changed. As a result, the total group delay characteristics can be dynamically controlled and changed.

Preferably, the second ring waveguide comprises a phase shifter on one of two arms of the Mach-Zehnder interferometer, the one arm located on the second ring waveguide. By adjusting a phase shifting amount of the phase shifter, the group delay characteristics of the second ring waveguide can be changed. As a result, a range of the usable band can be controlled by controlling the group delay characteristics of the second ring waveguide.

Preferably, the second ring waveguide comprises a loss medium. With this configuration, when optical coupling is performed using a Mach-Zehnder interferometer, it is possible to obtain group delay characteristics of the second ring waveguide having a polarity opposite to those of the first ring waveguides.

A chromatic dispersion device according to one embodiment of the invention is a device comprised of n ring resonators of the same FSR disposed in serial, wherein (n−1) first ring resonators of then ring resonators have group delay characteristics with a peak value of a first polarity and the last single resonator in the n ring resonators has group delay characteristics with a peak value of a polarity different from those of the first ring resonators.

BRIEF DESCRIPTION OF THE DRAWINGS

The above and other objects, features and advantages of the present invention will be apparent from the following detailed description of explanatory embodiments of the invention in conjunction with the accompanying drawings, in which.

DETAILED DESCRIPTION

Explanatory embodiments of the invention are explained below in detail with reference to the drawings.

Figure 1:
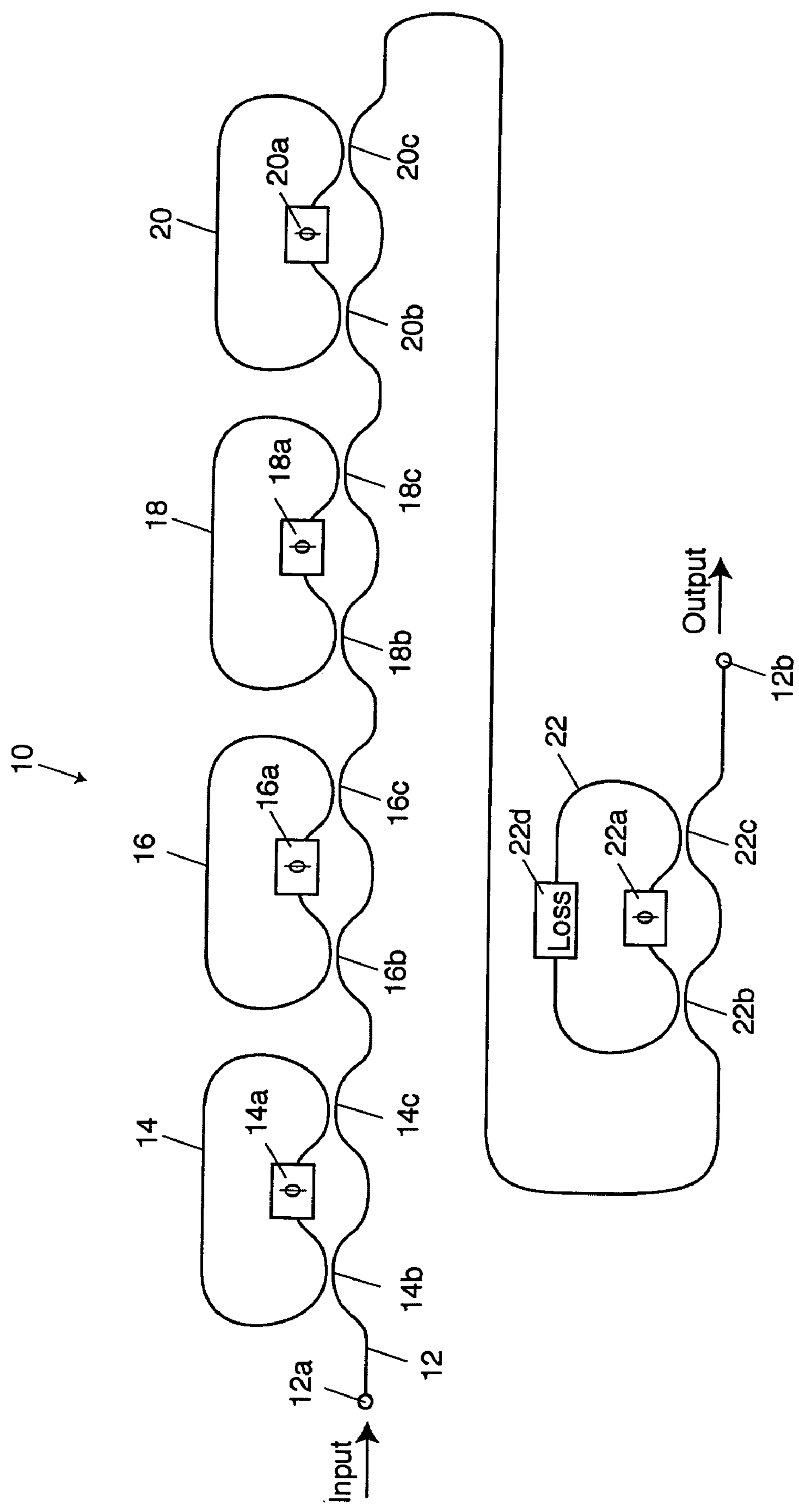
FIG. 1 is a schematic diagram of an explanatory embodiment according to the invention.

FIG. 1 shows a schematic block diagram of an explanatory embodiment according to one embodiment of the invention.

In FIG. 1, a chromatic dispersion device 10 comprises an input/output waveguide 12 and five ring waveguides 14, 16, 18, 20, and 22 disposed in serial in an optical axis direction of the input/output waveguide 12 and optically coupled with the input/output waveguide 12. That is, five-stage ring resonators are connected in serial. Although the details are explained later, a last stage ring resonator comprising the ring waveguide 22 is disposed so as to extend a passband. One end of the input/output waveguide 12 is an input port 12*a* and the other end is an output port 12*b*.

A Mach-Zehnder inter ferometer is formed between each of the ring waveguides 14, 16, 18, 20, 22 and the input/output waveguide 12. The ring waveguide 14 is explained below as an example. One arm of the Mach-Zehnder interferometer is disposed on the input/output waveguide 12, and the other arm is disposed on the ring waveguide 14. By connecting an output port of the other arm with an input port of the other arm, a closed ring, namely the ring waveguide 14 is formed.

A phase shifter 14*a* to shift optical phase of a propagating light is disposed on the arm of the Mach-Zehnder interferometer on the ring waveguide 14. The phase shifter 14*a* is realized using, for example, a heater to heat the arm of the Mach-Zehnder on the ring waveguide 14. Since directional optical couplers 14*b* and 14*c* disposed before and after both arms of the Mach-Zehnder interferometer do not directly connect between the input/output waveguide 12 and the ring waveguide 14, there is no excess loss caused by the direct coupling.

The other ring waveguides 16, 18, 20, and 22 are also optically coupled with the input/output waveguide 12 in the configuration similar to that of the ring waveguide 14. Phase shifters 16*a*, 18*a*, 20*a*, and 22*a* similar to the phase shifter 14*a* are also disposed on the other ring waveguides 16, 18, 20, and 22 respectively and the ring waveguides 16, 18, 20, and 22 optically couple with the input/output waveguide 12 with directional couplers 16*b*, 16*c*, 18*b*, 18*c*, 20*b*, 20*c*, 22*b*, 22*c* respectively.

Optical phase shifting amounts of the phase shifters 14*a* to 22*a* are not set the same, but each amount is separately set so that the total group delay characteristics become a desired shape. More specifically, the optical phase shifting amounts of the phase shifters 14*a* to 22*a* are controlled so that the resonant peaks of the ring waveguides 16, 18, and 20 become values of the same sign (e.g. positive value) and a resonant peak of the ring waveguide 22 becomes a value of the opposite sign (e.g. negative value). In this embodiment, by controlling the optical phase shifting amounts of the phase shifters 14*a* to 22*a*, the total group delay characteristics, namely the chromatic dispersion characteristics can be dynamically changed. The last ring waveguide 22 is disposed so as to extend a linear area of the total group delay characteristics.

Figure 10:
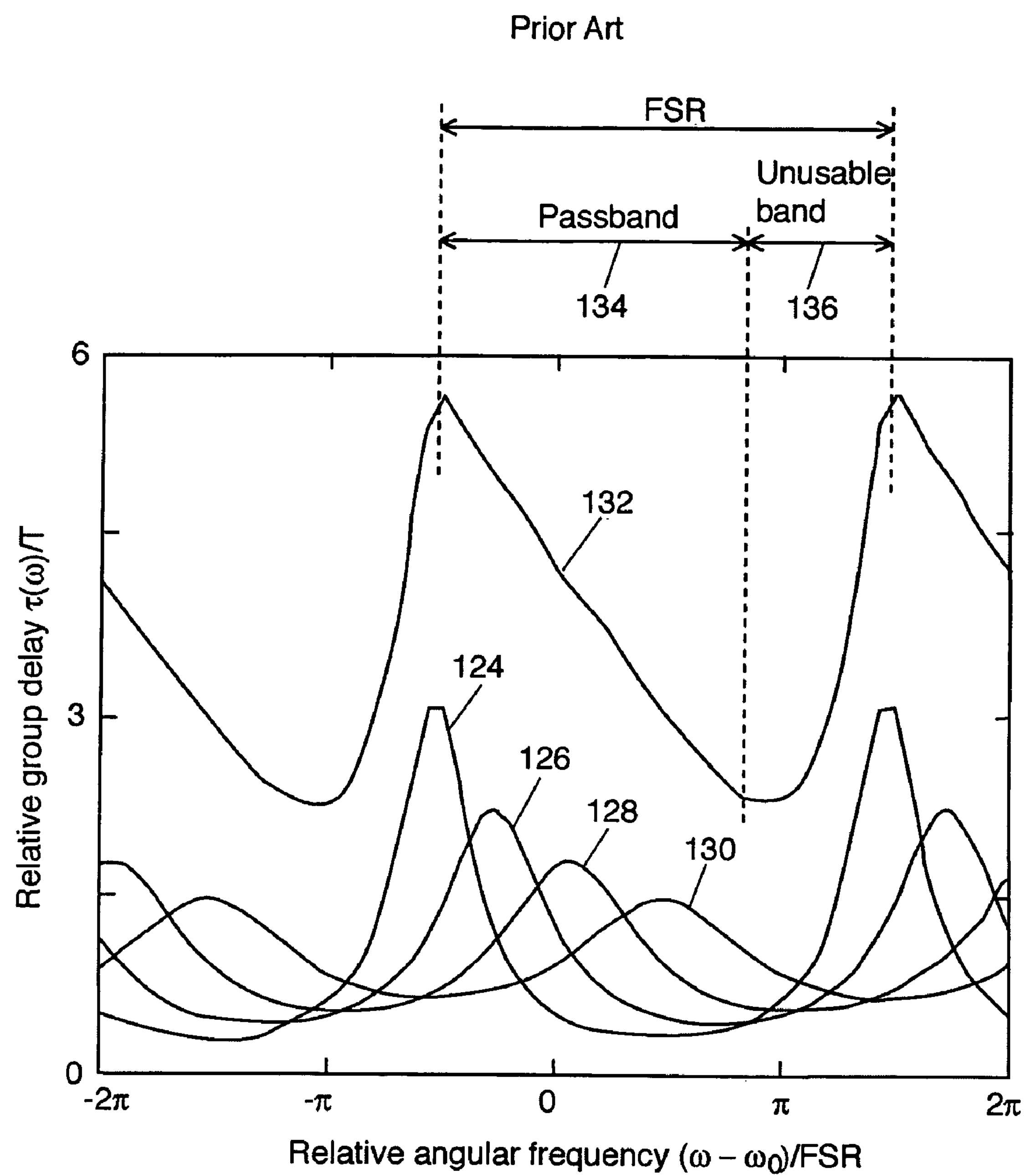
FIG. 10 shows a diagram of group delay characteristics of a conventional device.

As already explained, in a conventional configuration in which a plurality of ring waveguides optically coupled with an input/output waveguide are disposed in serial in the optical axis direction of the input/output waveguide, the group delay characteristics of the respective ring waveguide have the same sign (e.g. positive value) as shown in FIG. 10 and accordingly a range of unusable band becomes considerably wide in the total group delay characteristics, which are obtained by combining the respective group delay characteristics as shown in FIG. 10.

Figure 2:
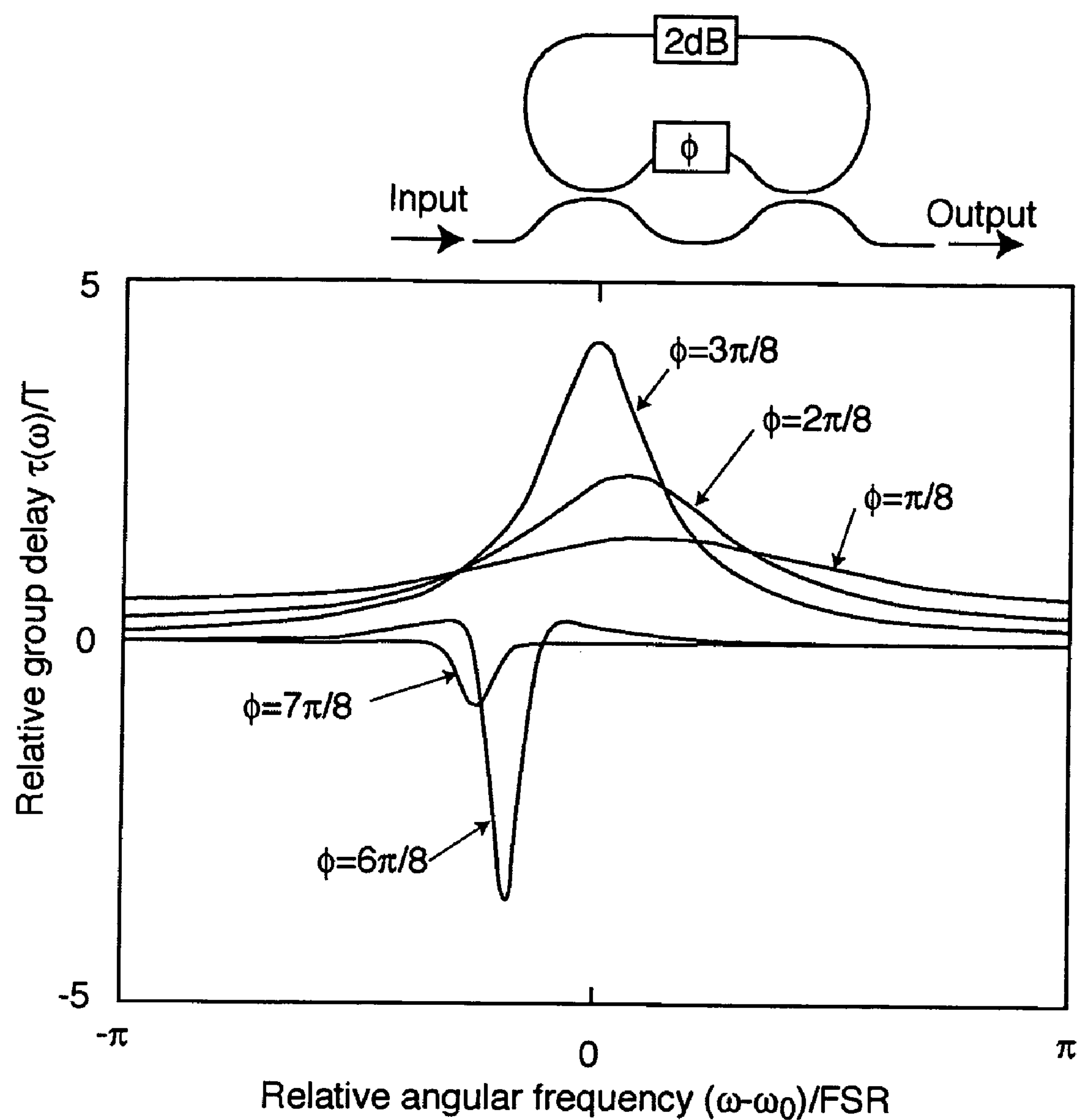
FIG. 2 shows a phase shifting amount $\phi$ relative to group delay characteristics in a ring resonator having loss.

The inventors of this invention discovered that it was possible to obtain the group delay characteristics of an opposite polarity value, e.g. negative value, in the respective ring waveguide by giving loss to the respective ring waveguide. FIG. 2 shows such a relation between an optical phase shifting amount of a phase shifter and a relative group delay where a roundtrip loss is 2 dB. In FIG. 2, the horizontal axis expresses relative angular frequency $(\Omega-\Omega_0)$/FSR, and the vertical axis expresses a relative group delay $\tau(\Omega)/T$. The symbol $\Omega$ denotes an angular frequency of a light to enter an input/output waveguide, $\Omega_0$ denotes a standard angular frequency, T denotes a standard delay time (second), and $\tau(\Omega)$ denotes a group delay time. As understandable from FIG. 2, a resonant peak of group delay characteristics became a negative value when $\phi=6\pi/8$ or $7\pi/8$. Since the characteristics shown in FIG. 2 depend on a round trip loss, it is also possible to make a resonant peak value of the group delay characteristics negative as well as to change the group delay characteristics by controlling the round trip loss.

According to the above results, in the explanatory embodiment shown in FIG. 1, a loss medium (or attenuator) 22*d* is disposed on the ring waveguide 22 so that a resonant peak of the group delay using the ring waveguide 22 becomes negative.

Figure 3:
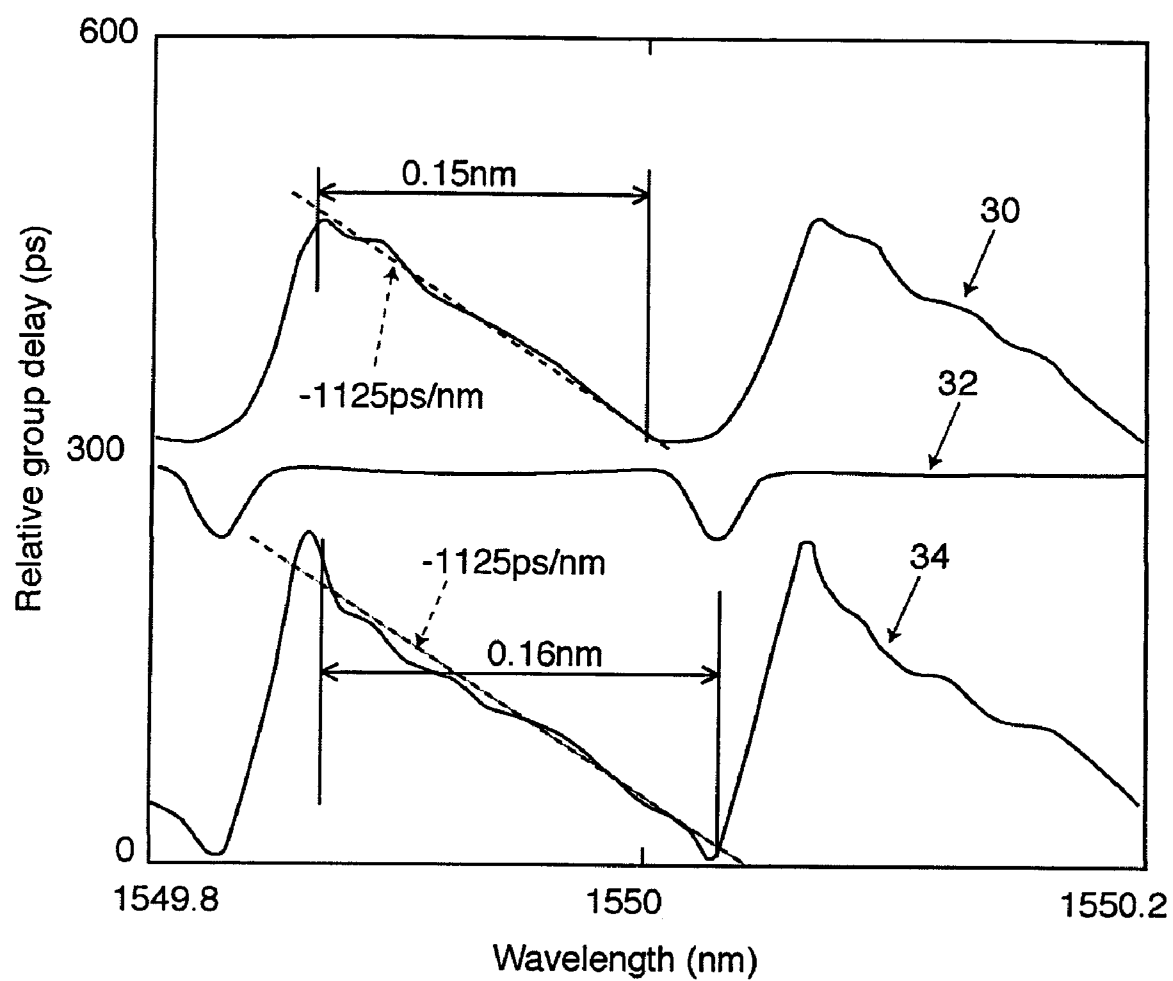
FIG. 3 shows group delay characteristics in a part having ring waveguides.

The function of the ring waveguide 22 is confirmed in the simulation to realize group delay characteristics similar to those described in FIG. 2 in the above-mentioned reference by C. K. Madsen, et al. FIG. 3 shows the results of the simulation. An FSR of each ring resonator composed of the ring waveguides 14, 16, 18, 20, and 22 is set to 25 GHz similar to the values used in the reference and a loss of the loss medium 22*d* is set to 2 dB. In FIG. 3, the horizontal axis expresses wavelength and the vertical axis expresses a relative group delay (ps). Characteristics 30 show the group delay characteristics of a part composed of the ring waveguides 14, 16, 18, and 20. Characteristics 32 show the group delay characteristics of a part composed of the ring waveguide 22. Characteristics 34 expresses the total group delay characteristics of the device 10, namely the group delay characteristics of the combination of the group delay characteristics 30 and 32.

In the characteristics 30, chromatic dispersion of −1125 ps/nm is realized in a wavelength range of 0.15 nm (75% relative to FSR) under the conditions that a peak-to-peak ripple is within a range of 20 ps. In the characteristics 34, the chromatic dispersion of −1125 ps/nm is realized within a wavelength range of 0.16 nm (80% relative to FSR) under the same ripple conditions. This means that the passband is extended by 0.01 nm because of the addition of the ring waveguide 22.

In FIG. 3, although the chromatic dispersion is negative, it is possible to change the chromatic dispersion into another value, e.g. positive value, by controlling or changing the phase shifting amount of the phase shifters 14*a* to 22*a* of the ring waveguides 14 to 22. In the ring waveguides 14 to 22, by adding a phase shifter having a variable phase shifting amount on the waveguides that are off from the Mach-Zehnder interferometer, the adjusting range of the chromatic dispersion can be extended.

The loss medium 22*d* on the ring waveguide 22 can be realized with a various method. Such configuration examples are shown in FIGS. 4 to 8.

Figure 4:
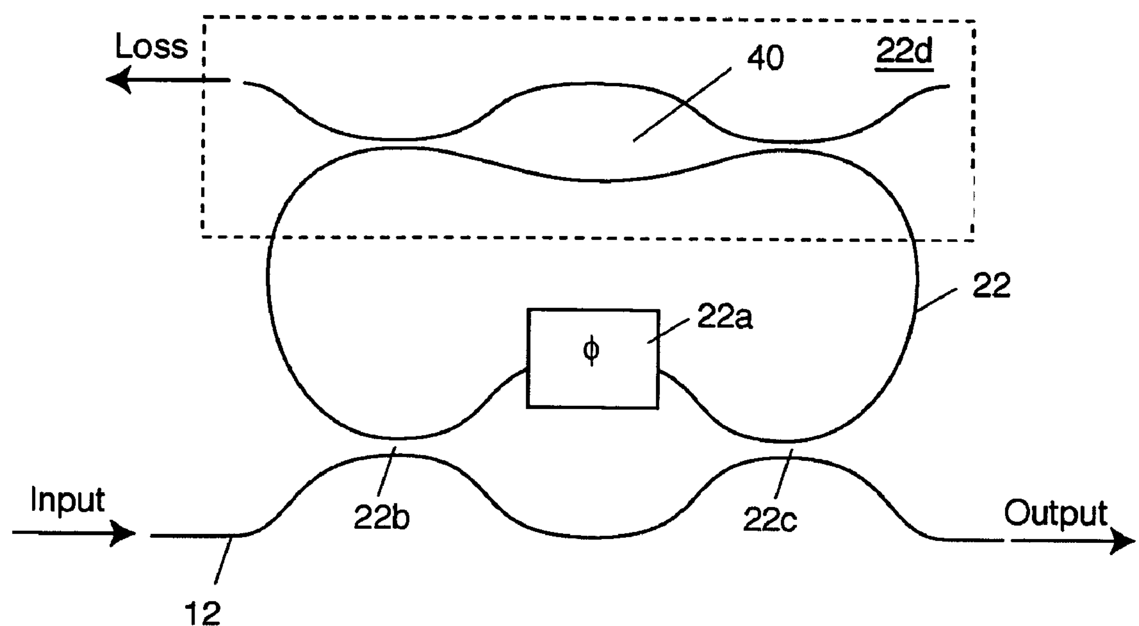
FIG. 4 shows a diagram of a first configuration example of a loss medium.

FIG. 4 shows a configuration in which another Mach-Zehnder interferometer type waveguide is further added to the ring waveguide 22 of FIG. 1. An output light from an output port of an added Mach-Zehnder interferometer 40, which is not connected with the ring waveguide 22, becomes a loss.

Figure 5:
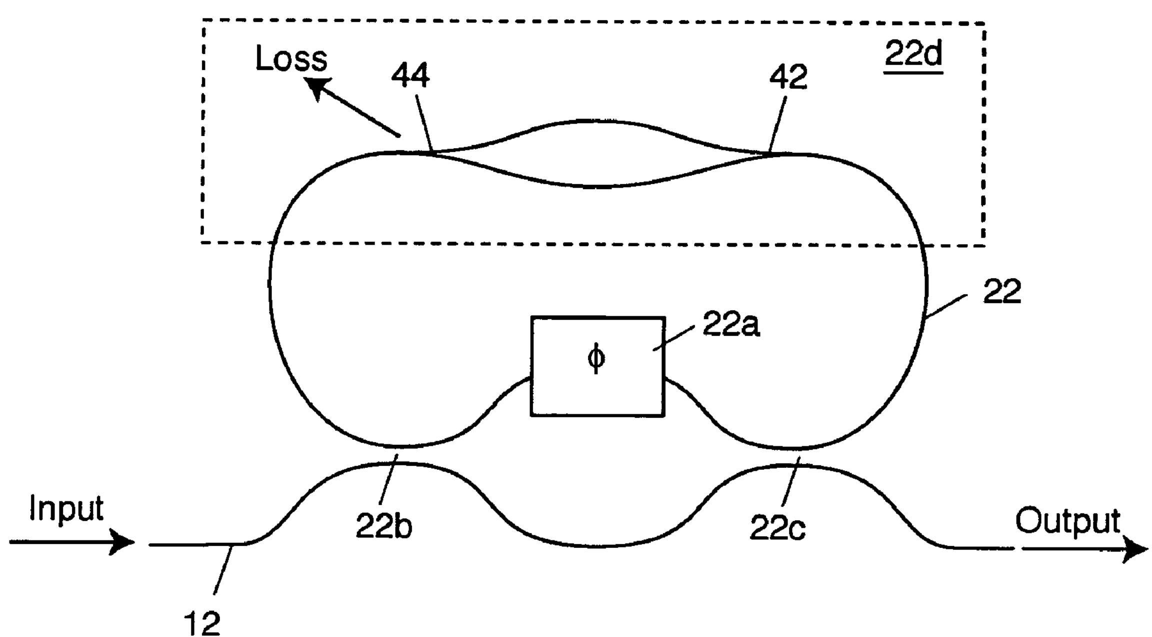
FIG. 5 shows a diagram of a second configuration example of a loss medium.

FIG. 5 shows a configuration in which Y branching optical circuit 42 and Y coupler 44 is added on the ring waveguide 22. A loss can be generated either on the branching part of the Y branching optical circuit 42 or on the coupling part of the Y coupler 44. It is also applicable that a loss medium is disposed in an optical path between the Y branching optical circuit 42 and the Y coupler 44.

Figure 6:
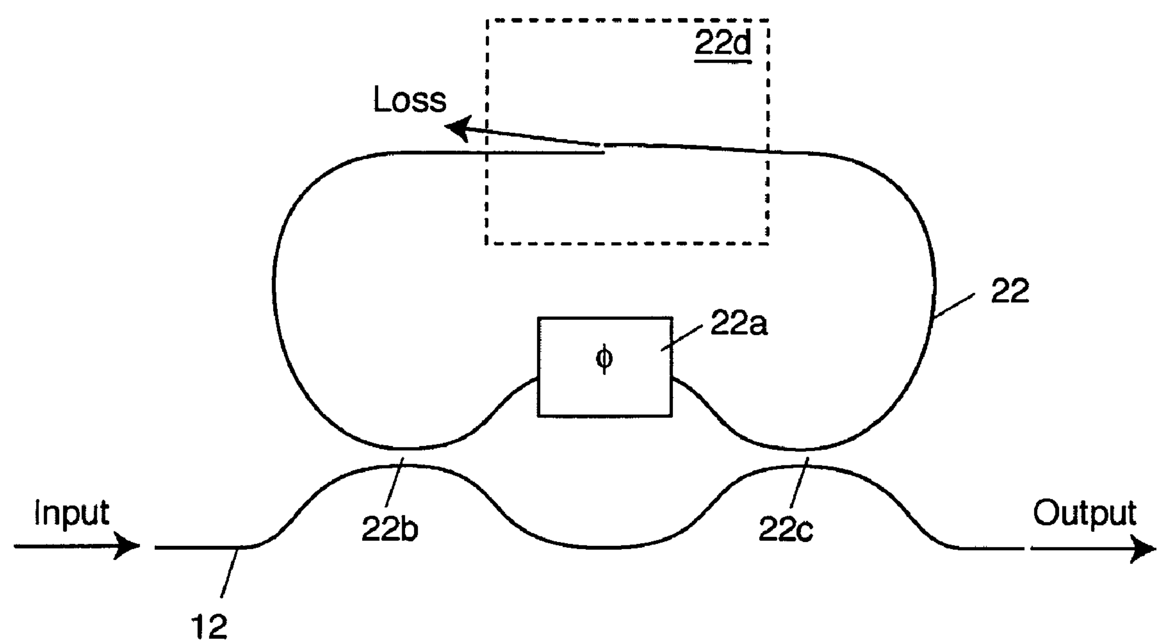
FIG. 6 shows a diagram of a third configuration example of a loss medium.

FIG. 6 shows a configuration in which the ring waveguide 22 is cut in the middle and shifted in the direction orthogonal to the optical axis. A loss is generated at the cut parts.

Figure 7:
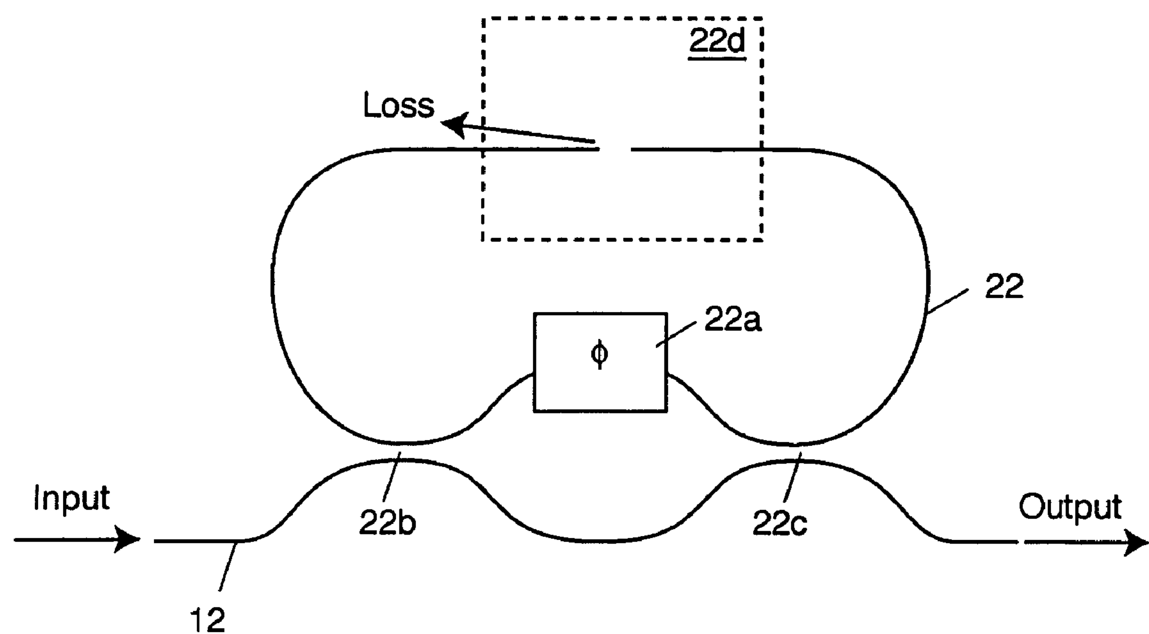
FIG. 7 shows a diagram of a fourth configuration example of a loss medium.

FIG. 7 shows a configuration in which the ring waveguide 22 is cut in the middle and then both cut ends are separated in the optical axis direction. A loss is generated at the cut parts.

Figure 8:
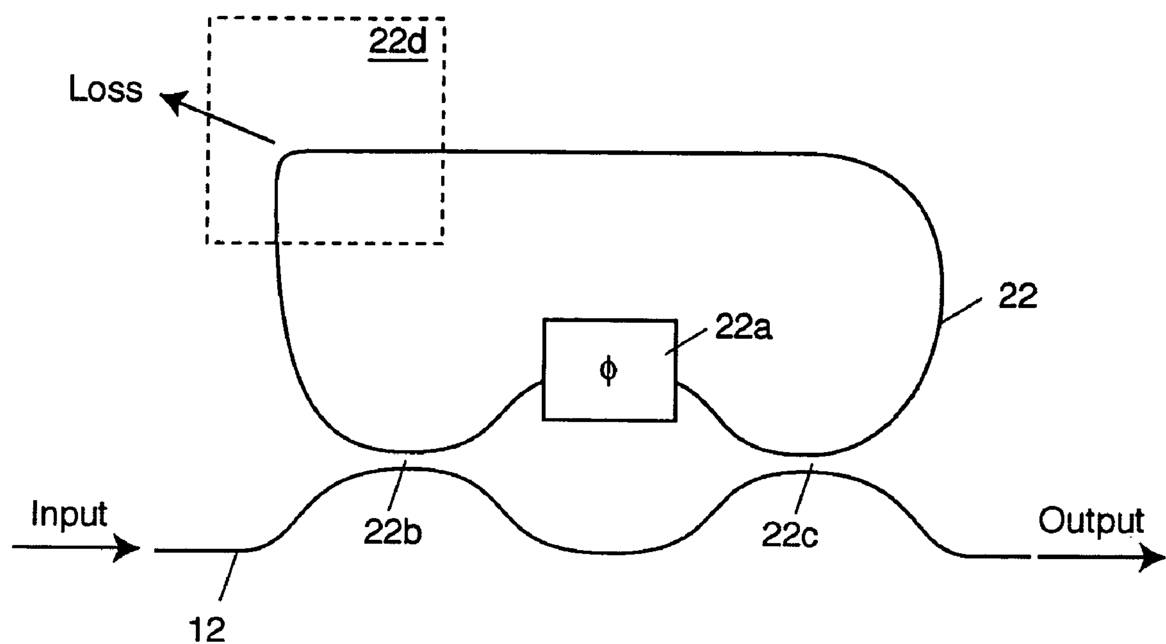
FIG. 8 shows a diagram of a fifth configuration example of a loss medium.

FIG. 8 shows a configuration in which a bend radius of a bend part of the ring waveguide 22 is reduced so as to generate a loss. A loss is generated at a small bend part.

Figure 9:
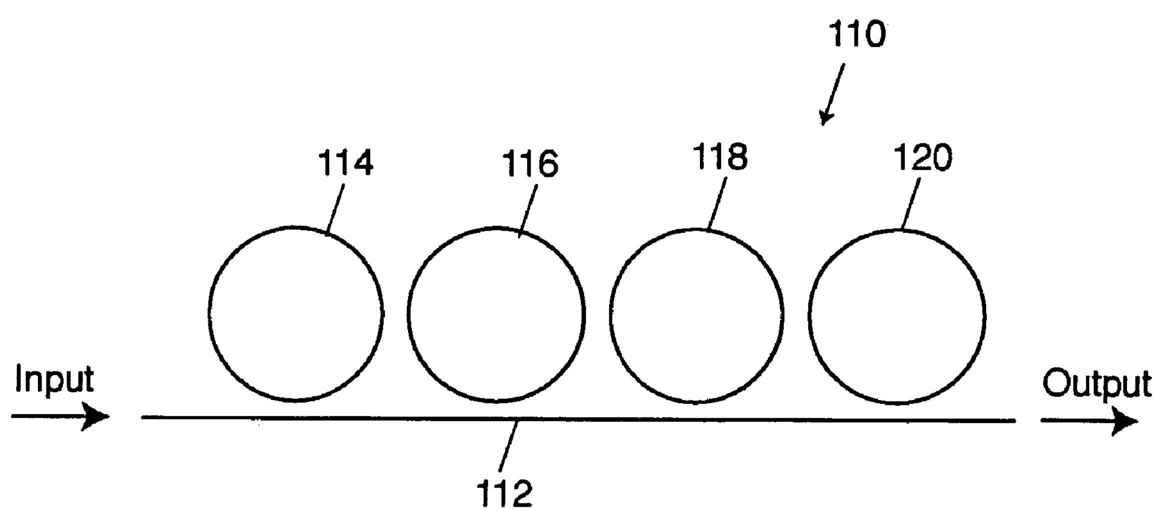
FIG. 9 shows a diagram of a conventional ring resonator type chromatic dispersion device.

Although all the ring wavelengths 14 to 22 are optically coupled with the input/output waveguide 12 through the Mach-Zehnder interferometer, the ring waveguides 14 to 20 can be connected with the input/output waveguide 12 through a single directional coupling part similar to the conventional configuration shown in FIG. 9. However, in such a case, a chromatic dispersion value is fixed.

In the respective optical coupling parts 14*b* to 22*b* and 14*c* to 22*c* between the respective ring waveguides 14 to 22 and the input/output waveguide 12, although we explained the embodiments in which the respective waveguides 14 to 22 and the input/output waveguide 12 are physically separated, this invention is also applicable to such a configuration of closer connection in which the ringwave guides 14 to 22 and the input/output waveguide 12 are partly or entirely connected at the optical coupling parts 14*b* to 22*c* and 14*c* to 22*c*.

In the above embodiments, the ring waveguide 22 to extend the linearity of the chromatic dispersion characteristics is disposed on the last stage. However, the ring waveguide 22 can be disposed on other location, such as prior to the ring waveguide 14, between the ring waveguide 14 and the ring waveguide 16, between the ring waveguide 16 and the ring waveguide 18, or between the ring waveguide 18 and the ring waveguide 20.

While the invention is explained referring to the specific explanatory embodiments, it will be apparent to those skilled in the art that various changes and modifications can be made to the specific embodiment without departing from the spirit and scope of the invention as defined in the claims.

The invention claimed is:

1. A chromatic dispersion device comprising:

an input/output waveguide;

a plurality of first ring waveguides optically coupled with the input/output waveguide through directional coupling and disposed along an optical axis direction of the input/output waveguide, each ring waveguide having a predetermined free spectral range (FSR) and group delay characteristics with a peak value of same polarity; and a second ring waveguide optically coupled with the input/output waveguide through directional coupling, the second ring waveguide having the predetermined FSR and group delay characteristics with a peak value of a polarity different from the polarities of the first ring waveguides.

2. The device of claim 1 wherein the plurality of first ring waveguides and the second ring waveguide are optically coupled with the input/output waveguide through two optical coupling parts which form a Mach-Zehnder interferometer.

3. The device of claim 2 wherein a respective first ring waveguide comprises a phase shifter on one of two arms of a Mach-Zehnder interferometer, the one arm located on the respective first ring wavelength.

4. The device of claim 3 wherein the second ring waveguide comprises a phase shifter on one of the two arms of a Mach-Zehnder interferometer, the one arm located on the second ring waveguide.

5. The device of claim 1 wherein the second ring waveguide comprises a loss medium.

6. A chromatic dispersion device comprising:

n ring resonators of same free spectral range (FSR) disposed in serial, wherein (n−1) first ring resonators of the n ring resonators have group delay characteristics with a peak value of a first polarity, and the last ring resonator of the n ring resonators has group delay characteristics with a peak value of a polarity different from the first polarity.

7. A chromatic dispersion device comprising:

a plurality of ring resonators optically coupled in series, each of the plurality of ring resonators having same free spectral range (FSR) and group delay characteristic with a peak value of a first polarity; and a last ring resonator optically coupled in series with one of the plurality of ring resonators having the same FSR and a group delay characteristic with a peak value of a polarity different from the first porality.

8. A chromatic dispersion device comprising:

a plurality of ring waveguides optically coupled in series, each of the plurality of ring waveguides having same free spectral range (FSR) and group delay characteristic with a peak value of a first polarity; and a last ring waveguides optically coupled in series with one of the plurality of ring waveguides having the same FSR and a group delay characteristic with a peak value of a polarity different from the first porality.

9. The device of claim 8 wherein the plurality of ring waveguides and the last ring waveguide are optically coupled with an input/output waveguide through two optical coupling parts which form a Mach-Zehnder interferometer.

10. The device of claim 9 wherein a ring waveguide of the plurality of ring waveguides comprises a phase shifter on one of two arms of a Mach-Zehnder interferometer, the one arm located on the ring wavelength.

11. The device of claim 10 wherein the last ring waveguide comprises a phase shifter on one of the two arms of a Mach-Zehnder interferometer, the one arm located on the last ring waveguide.

12. The device of claim 8 wherein the last ring waveguide comprises a loss medium.

* * * * *